Patented Mar. 6, 1923.

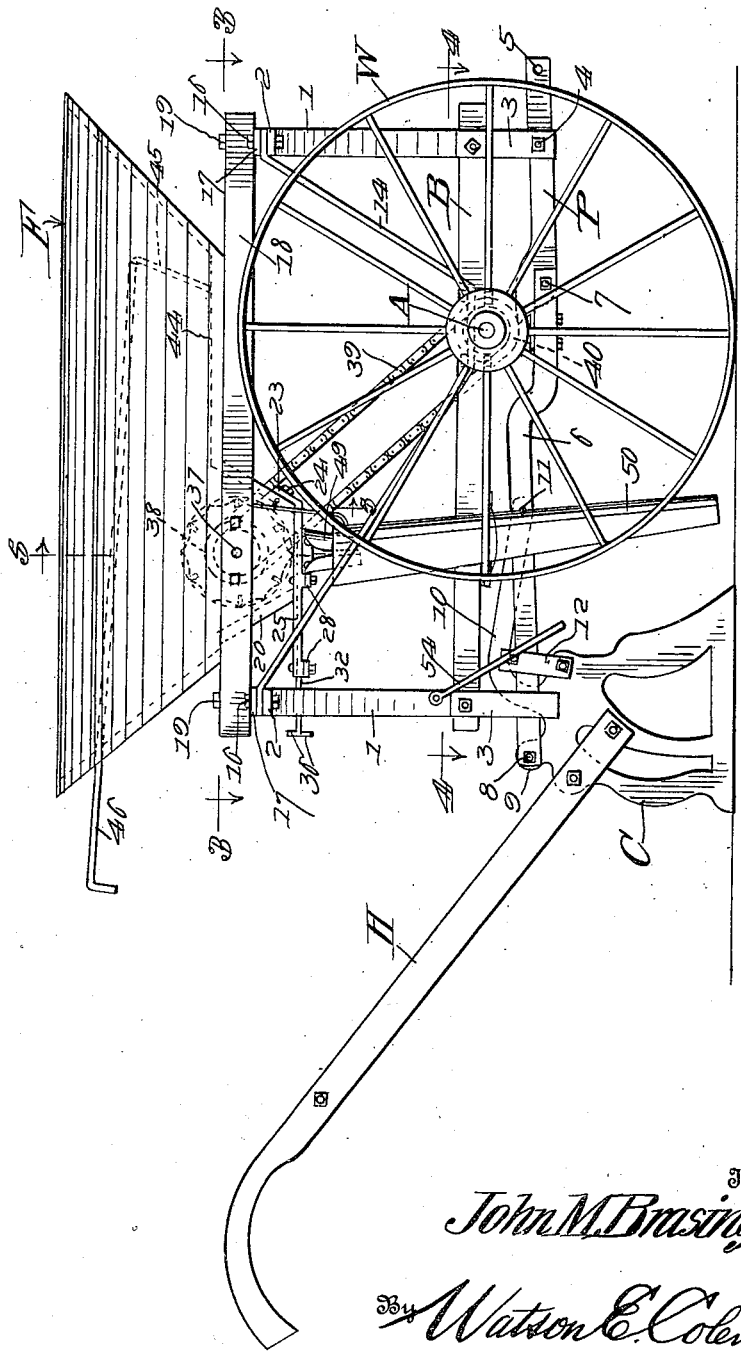

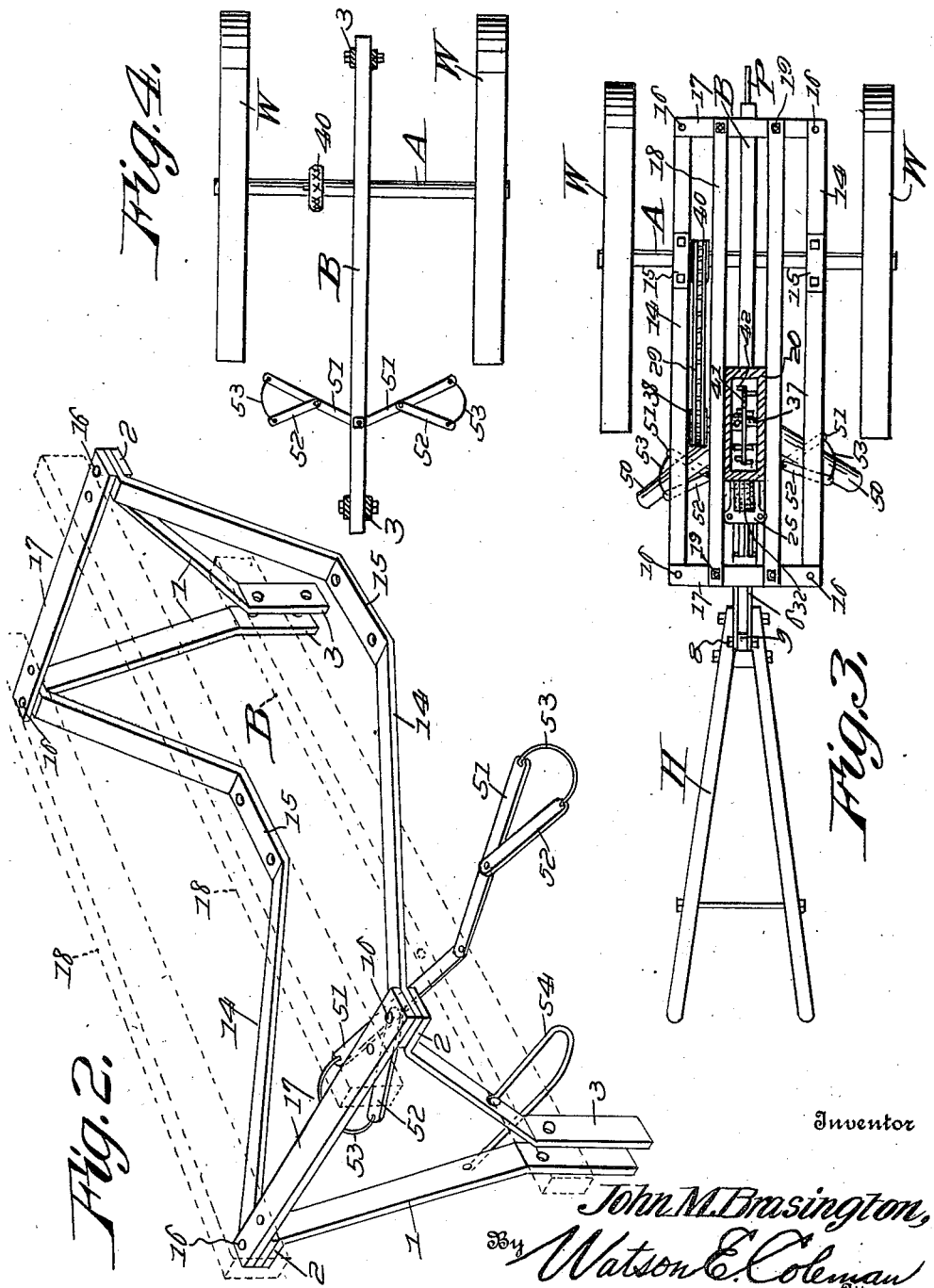

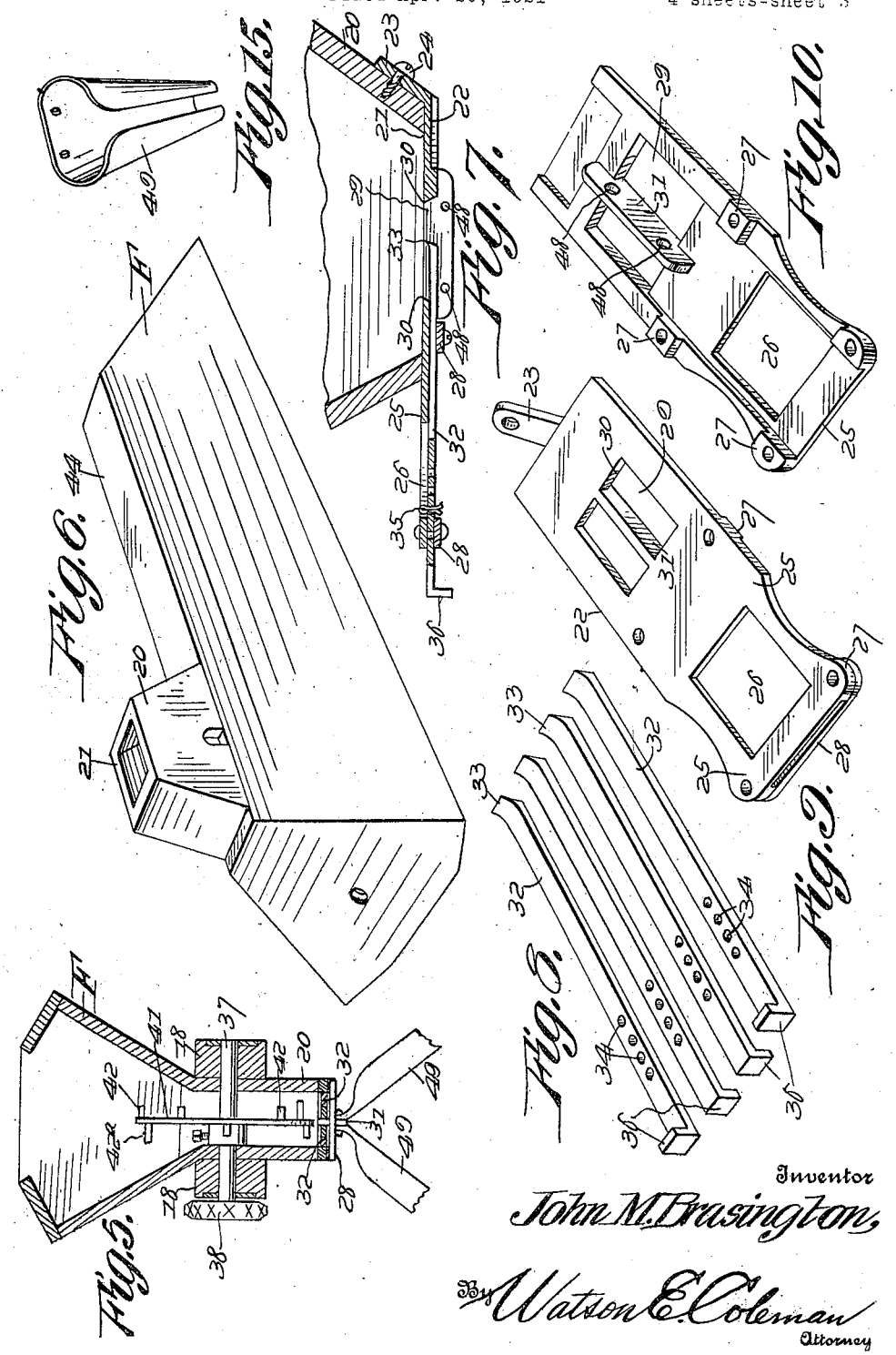

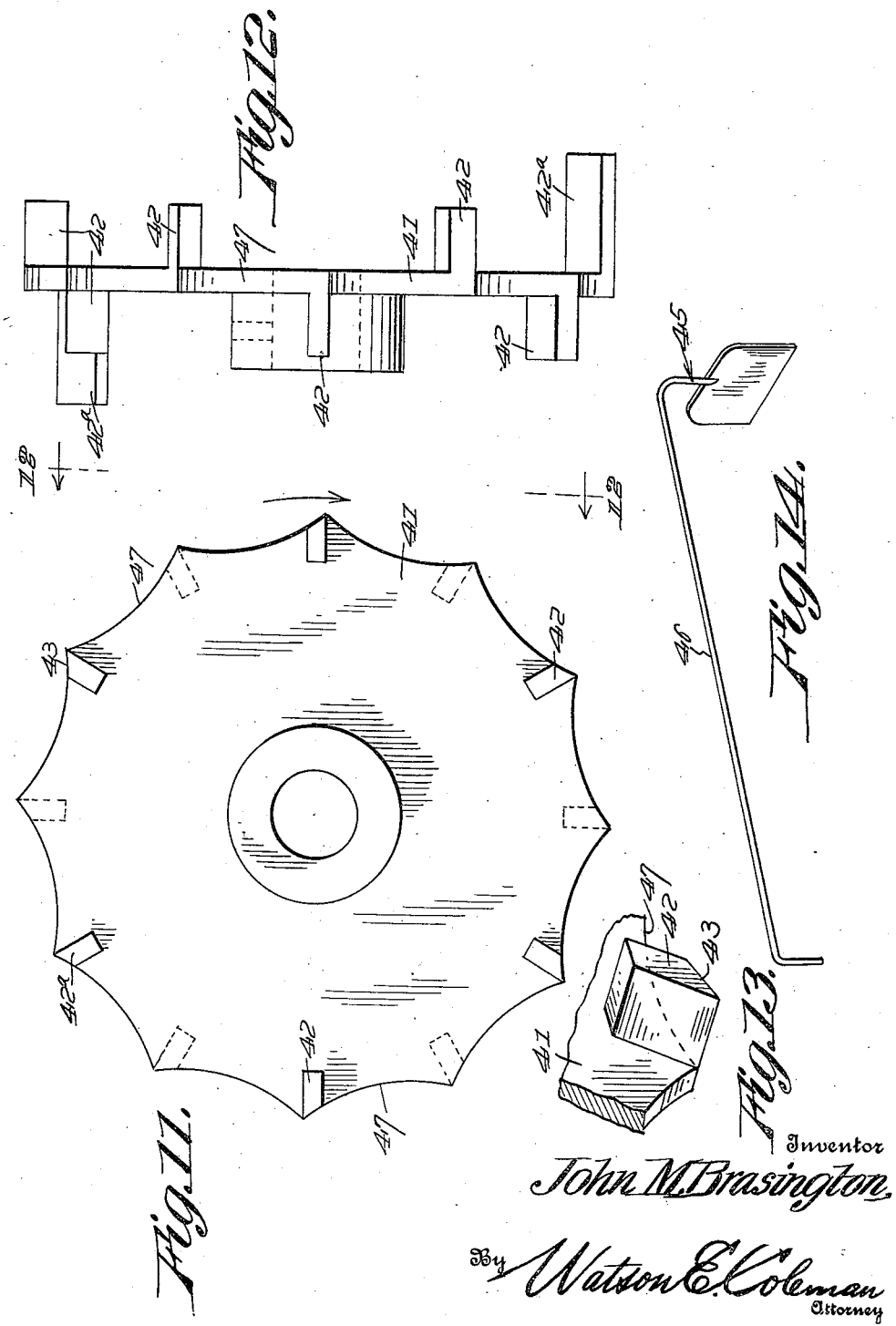

1,447,292

UNITED STATES PATENT OFFICE.

JOHN M. BRASINGTON, OF CHERAW, SOUTH CAROLINA.

FERTILIZER DISTRIBUTOR.

Application filed April 20, 1921. Serial No. 462,923.

*To all whom it may concern:*

Be it known that I, JOHN M. BRASINGTON, a citizen of the United States, residing at Cheraw, in the county of Chesterfield and State of South Carolina, have invented certain new and useful Improvements in Fertilizer Distributors, of which the following is a specification, reference being had to the accompanying drawings.

This invention relates to improvements in fertilizer distributors, and it is an object of the invention to provide a device of this general character embodying novel and improved means for agitating and feeding the material through the discharge opening of the hopper, said means operating to produce a substantially uniform feed of the fertilizer and being capable of cutting and reducing the lumps or clogs to prevent clogging of the discharge opening.

Another object of the invention is to provide a novel and improved device of this general character including a hopper constructed in a manner to contain a surplus of fertilizer, together with means whereby said surplus of fertilizer may be brought into a position to be discharged from the hopper.

An additional object of the invention is to provide a novel and improved device of this general character embodying a wheel supported frame carrying a hopper having a feeding and agitating means associated therewith, together with a plow beam operatively engaged with the frame and in a manner whereby the frame and beam are capable of having relative movement in a vertical direction.

Another object of the invention is to provide a novel and improved fertilizer distributor including a feed wheel or agitator provided with oppositely directed arms, said arms being alternately arranged at opposite sides of the wheel and provided with chisel edges in the direction of travel of said wheel whereby the fertilizer is comminuted without packing and wherein an arm at each side of the wheel is of a length greater than the remainder of said arms so that action is had upon all of the material within the feeding portion of the hopper to assure the requisite discharge of the fertilizer.

A still further object of the invention is to provide a novel and improved device of this general character including a plurality of delivery spouts, preferably two in number, and each of which spouts is supported in such a manner to permit the same to be thrown or adjusted to different positions from the center of the machine proper.

The invention also has for an object a novel and improved device of this general character including a feed hopper embodying a bed plate provided with a plurality of gates operating in a manner to throw substantially the same quantity of material on each side of the machine and also having an adjustment so that regulation can be had of the quantity of fertilizer to be discharged from the hopper.

The invention consists in the details of construction and in the combination and arrangement of the several parts of my improved fertilizer distributor whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in side elevation of a fertilizer distributor constructed in accordance with an embodiment of my invention, the plow lay being omitted;

Figure 2 is a view in perspective of a portion of the supporting frame for the hopper, other parts being indicated by dotted lines;

Figure 3 is a horizontal sectional view taken substantially on the line 3—3 of Figure 1;

Figure 4 is a horizontal sectional view taken substantially on the line 4—4 of Figure 1;

Figure 5 is a vertical sectional view taken substantially on the line 5—5 of Figure 1;

Figure 6 is a view in perspective of the hopper as herein embodied inverted;

Figure 7 is an enlarged fragmentary vertical sectional view taken through the discharging portion of the hopper;

Figure 8 is a view in perspective of the regulating gates coacting with the bed plate of the hopper detached;

Figure 9 is a view in perspective of the bed plate;

Figure 10 is a view in perspective of the bed plate inverted;

Figure 11 is a view in side elevation of the feed wheel as herein embodied;

Figure 12 is a view in end elevation of the structure as illustrated in Figure 11 and as indicated by the arrows on the line 12—12.

Figure 13 is a fragmentary view in perspective, illustrating one of the short arms extending laterally from feed wheel.

Figure 14 is a view in perspective of the manually operated implement for bringing the surplus material within the hopper into position for discharge; and Figure 15 is a view in perspective of the chute as herein comprised, detached.

As disclosed in the accompanying drawings, B denotes a beam of desired length and which has its rear portion mounted upon a transversely disposed axle A. Mounted upon the opposite end portions of the axle A are the supporting wheels W and with which the axle A rotates upon the travel of the device. Secured to each end portion of the beam B is a pair of transversely disposed arms 1 extending upwardly in divergence and terminating in the outwardly disposed extensions or seats 2. The end portions 3 of each pair of arms 1 secured to the beam B extend downwardly in parallelism and below said beam. The lower extremities of the portions 3 of the forward arms 1 have pivotally connected therewith by the horizontally disposed bolt 4, or the like, the forward end portion of a rearwardly disposed plow beam P. The beam P extends between the portions 3 of both pairs of arms 1 and the forward end portion of said beam P extends in advance of the beam B and is provided with an opening 5, or other suitable means, whereby a draft animal, or the like, may be hitched thereto. By this particular mounting of the beam P, the beams P and B are capable of relative movement in a vertical direction as may be required by the necessities of practice. The depending portions 3 of the arms 1 and particularly the rear pair hold the beam B against lateral movement so that the relative vertical movement of the beams P and B is in substantially a fixed path of travel.

The rear portion of the beam P comprises two transversely spaced members or bars 6 bolted as at 7, or otherwise secured, at their forward ends to the opposite side faces of the beam P while the rear end portions of said members or straps 6 are bolted, as at 8, to an upstanding lug 9, carried by the upper portion of the body or casting C to which a suitable plow lay is adapted to be secured. The body or casting C is also provided with the forwardly disposed standard 10 having its free end portion secured, as at 11, between the members or straps 6. The forward portion of the body or casting C, at its upper part, is further secured to the members or straps 6 by a clamp 12, of a conventional type. The body of casting C also has secured thereto the upwardly and rearwardly inclined handle members H.

Arranged at opposite sides of the beam B are the members 14, substantially in the form of an inverted V with their apices straight, as at 15, and adapted to be clamped or otherwise secured to the opposite end portions of the axle A but in a manner to afford no hindrance to the requisite rotation thereof. The opposite end portions of the side members 14 are bolted or otherwise secured to the extensions or seats 2 and the attaching bolts 16 also coact to hold in applied position the transversely disposed end members 17 having their extremities resting upon the end portions of the side members 14.

Resting upon the end members 17 are the longitudinally disposed beams 18 arranged in parallelism with their opposite end portions secured to said end members 17 by the bolts 19, or the like.

Supported by the beams 18 is a feed hopper F having its sides and end walls inclined downwardly and inwardly and provided at one end portion with a depending extension 20. The lower wall or bottom of the well 20 is open to provide the discharge opening 21. This portion or well 20 also extends between the beams 18 and terminates therebelow, as is particularly illustrated in Figure 5 of the accompanying drawings.

Underlying the discharge opening 21 is a bed plate 22 bolted or otherwise secured to the edges of the extension or well 20 defining the opening 21. One end portion of the plate 22 is provided at its central portion with an upstanding tongue or extension 23 secured by the screw 24, or the like, to the forward inclined face of the extension or well 20. The plate 22 is of a length to extend beyond the rear end of the well or extension 20 and said extended portion 25 has its central part cut out, as at 26. The plate 22 is provided at longitudinally spaced points with the depending lugs 27 arranged in series with the lugs of each series in transversely spaced relation. A pair of side lugs is arranged adjacent the outer end of the extension 25 while the second or inner pair of lugs 27 is positioned at a point adjacent the opening 21 proper of the extension or well 20. Each pair of lugs 27 is connected by a cross member or strap 28 whereby a guideway is provided between said cross members or straps 28 and the under surface of the plate 22 or its extended portion 25. The portion of the plate underlying the opening 21 is cut out, as at 29, to provide an opening through which the fertilizer is discharged and the forward and rear edges defining said opening 29 are beveled whereby the upper margins thereof constitute the knife edges 30.

The plate 22 is also provided with the longitudinally disposed depending web or rib 31, bridging the opening 29 for a purpose to be hereinafter more particularly referred to.

Underlying the plate 22 and slidably supported by the cross members or straps 28 are the elongated gate members 32 which, when in applied position, are arranged in parallelism and at opposite sides of the depending rib or web 31 and, as herein embodied, the members 32 at each side of the web 31 are two in number although, in practice, they may be any multiple of two. The adjacent members 32 of each series are substantially in contact and the inner end portions thereof terminate in the upstanding knife edges 33, preferably disposed on an incline toward an end edge defining the forward edge of the opening 29. By imparting requisite endwise movement to the members 32, the opening 29 at either or both sides of the web or rib 31 may be closed or regulated in accordance with the requirements of practice.

Each of the members 32 adjacent its outer end is provided with a series of longitudinally spaced openings 34 through which a cotter pin 35, or the like, is adapted to be disposed and which pin contacts with the outer edge defining the opening 26 or the adjacent edge of the outer cross member or strap 28 so that said gate member 32 is prevented from moving outwardly beyond a desired extent. The outer end portions of the gates or members 32 are also provided with the angularly disposed lugs or lips 36 whereby the requisite endwise movement may be imparted to each of said gates or members 32.

Rotatably supported by the beams 18 and extending transversely through the upper part of the depending portion or well 20 is a shaft 37 having affixed to one end portion the sprocket wheel 38 around which is directed the chain 39 also engaged with a sprocket 40 fixed to the axle A whereby the shaft 37 is driven from said axle A. Mounted upon the shaft 37 for rotation therewith is a feed wheel or disc 41. The peripheral portion of the wheel or disc 41 is provided with a plurality of lateral arms 42 equidistantly spaced in a direction circumferentially of the wheel or disc 41 with the arms 42 alternating on the opposite sides of the disc or wheel 41. Extending outwardly from each side of the wheel or disc 41 at substantially diametrically opposed points are the arms 42$^a$ of a length greater than the arms 42 and each of the arms 42 and 42$^a$ is provided, as at 43, with a knife or chisel edge disposed in the same general direction as the direction of travel of the wheel or disc 41. The knife or chisel edges 43 of the arms 42 and 42$^a$ result in an effective cutting or comminuting of the fertilizer within the hopper without scooping or packing such material. By providing the longer arms 42$^a$ and which are of a length to closely approach the opposed walls of the depending portion or well 20, requisite action is had upon all of the material within said portion or well 20, resulting in the requisite falling of such material so that the short arms 42 may have the requisite action thereon and by having only a single arm 42$^a$ on each side of the wheel or disc 41, less power or pull is required to rotate said wheel or disc.

It is to be particularly noted that the chisel edge 43 of each of the arms 42 and 42$^a$ constitutes the outer face of such arm with the high point of the cutting edge merging with a face of an arm substantially radial to the disk or wheel 41. It is this particular construction and arrangement of the arms 42 and 42$^a$ which prevents scooping or packing of the material within the hopper.

The knife edges 30 and 33, hereinbefore referred to, also effectively coact with the fertilizer or material to facilitate the requisite cutting thereof and to reduce lumps or clogs therein to prevent clogging of the discharge opening.

The bottom 44 of the hopper F in advance of the depending portion or well 20 is horizontally disposed for a material distance whereby the hopper F is provided with an extended front portion adapted to contain a surplus of fertilizer and which fertilizer is adapted to be moved rearwardly, as required, in requisite relation to the wheel or disc 41 through the instrumentality of the scraping implement 45 adapted to be manually operated and which implement includes an elongated handle 46 extending exteriorly of the hopper F through the rear end thereof so that the same may be readily engaged by the operator to impart the requisite reciprocatory movement thereto.

In order to facilitate the requisite functioning of the arms 42 and 42$^a$, the peripheral portion of the wheel or disc 41 between each pair of adjacent arms 42 or 42$^a$ is arranged on an inwardly disposed arcuate line, as indicated at 47, and as particularly illustrated in Figure 11. The rib or web 31 is provided with a plurality of longitudinally spaced openings 48 providing means whereby a metallic chute 49 may be arranged at each side of said web or rib 31 to discharge within a spout 50.

Pivotally engaged with the under surface of the beam B at the rear part thereof are the inner end portions of the oppositely directed arms 51. Each of the arms 51 has pivotally engaged therewith a desired distance inwardly of its outer end the inner end portion of a branch arm 52 and the outer end portions of the arms 51 and 52 are connected by the flexible member or loop 53. Each of the spouts is extended between the arms 51 and 52 and inwardly of the loop or member 53 whereby said spout is effectively maintained in applied position and by swinging the arm 51, the coacting spout 50 may be moved or adjusted laterally, as the occasions of practice may prefer.

Secured to the lower portions of the rear arms 1 above the beam B are the free end portions of a yoke 54 and the yoke 54 extends forwardly and downwardly and underlies the members or straps 6 so that the yoke 54 serves, by contact from below with the members or straps 6, as a stop to limit the relative movement of the beams B and P one with respect to the other.

From the foregoing description, it is thought to be obvious that a distributor constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:—

1. A fertilizer distributor provided with a rotary feeding member, and arms extending laterally from the peripheral portion of said member, said arms having their outer faces formed into chisel edges.

2. A fertilizer distributor comprising, in combination, a hopper provided with a discharge opening, a rib carried by said hopper and extending across the discharge opening, chutes secured to the opposite sides of the rib and underlying the discharge opening of the hopper, and spouts into which the chutes discharge.

3. A fertilizer distributor comprising, in combination, a hopper provided with a discharge opening, a rib carried by said hopper and extending across the discharge opening, chutes secured to the opposite sides of the rib and underlying the discharge opening of the hopper, spouts into which the chutes discharge, and regulating gates for the discharge opening of the hopper arranged at opposite sides of the rib.

4. A fertilizer distributor comprising, in combination, a hopper provided with a discharge opening, a rib carried by said hopper and extending across the discharge opening, chutes secured to the opposite sides of the rib and underlying the discharge opening of the hopper, spouts into which the chutes discharge, and regulating gates for the discharge opening of the hopper arranged at opposite sides of the rib, said gates being independently operable.

5. A fertilizer distributor comprising, in combination, a hopper provided with a discharge opening, a rib carried by said hopper and extending across the discharge opening, chutes secured to the opposite sides of the rib and underlying the discharge opening of the hopper, spouts into which the chutes discharge, and regulating gates for the discharge opening of the hopper arranged at opposite sides of the rib, said gates being endwise movable and having their inner ends provided with upwardly disposed knife edges.

6. A fertilizer distributor comprising, in combination, a hopper provided with a discharge opening, a rib carried by said hopper and extending across the discharge opening, chutes secured to the opposite sides of the rib and underlying the discharge opening of the hopper, spouts into which the chutes discharge, and regulating gates for the discharge opening of the hopper arranged at opposite sides of the rib, said gates being independently operable, edges defining the discharge opening of the hopper being formed into upwardly directed chisel edges.

7. A fertilizer distributor comprising, in combination, a hopper provided with a discharge opening, a rib carried by said hopper and extending across the discharge opening, chutes secured to the opposite sides of the rib and underlying the discharge opening of the hopper, spouts into which the chutes discharge, regulating gates for the discharge opening of the hopper arranged at opposite sides of the rib, and adjustable means for controlling the opening movement of each of the gates.

8. A fertilizer distributor provided with a rotary feed member and arms extending laterally from the peripheral portion of said member, said arms having their outer faces formed into chisel edges, the peripheral portion of the feed member between each pair of adjacent arms being arranged on an inwardly disposed arcuate line.

9. A fertilizer distributor provided with a rotary feed member, arms extending laterally from the peripheral portion of said member, said arms having their outer faces provided with chisel edges, the high point of the chisel edge of each of the arms merging with a side face of the arm disposed substantially radial of the feed member.

In testimony whereof I hereunto affix my signature.

JOHN M. BRASINGTON.